Figure 1:
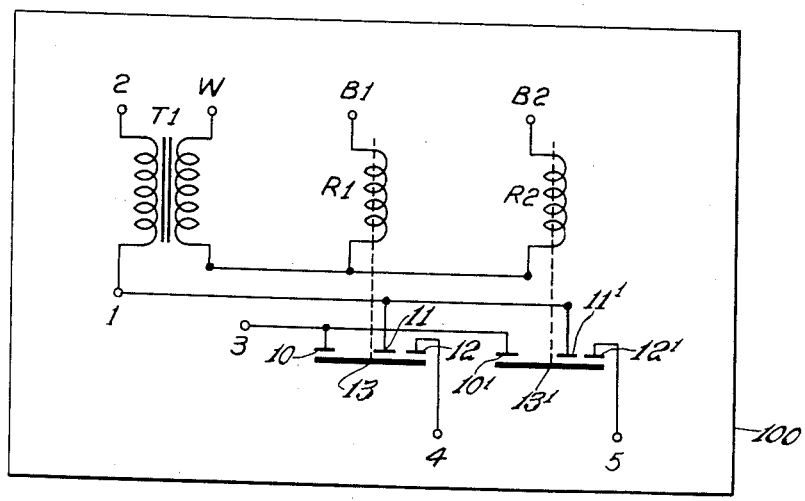

March 5, 1957  W. J. ANDERSON  2,783,976
CONTROL UNIT
Filed Jan. 31, 1955

INVENTOR.
Warren J. Anderson

United States Patent Office 2,783,976
Patented Mar. 5, 1957

2,783,976

CONTROL UNIT

Warren J. Anderson, Hillside, N. J.

Application January 31, 1955, Serial No. 485,272

10 Claims. (Cl. 257—3)

My invention relates to air conditioning systems and more particularly relates to control apparatus for use therein.

Air conditioning is a generic term which describes both air cooling and air heating systems. The prior art has knowledge of systems of this kind wherein a suitable conditioning fluid (either heated or cooled) is pumped through a heat exchanger such as a finned coil. Through action of a fan, air is forced over the active surfaces of the coil and is heated or cooled as desired. The air so treated or conditioned is then supplied to the room or zone to be conditioned. A main thermostat positioned either in the stream of conditioned air or in the room itself is electrically connected to the fan in such manner that the fan is only operative when the thermostat is unsatisfied, and is inoperative when the thermostat is satisfied. The conditioning fluid is pumped continuously through the coil at all times; heating or cooling mechanisms under the control of an auxiliary thermostat responsive to the temperature of the conditioning fluid in turn maintain the fluid temperature at a substantially uniform value chosen for the particular system application desired.

Such known systems have inherent disadvantages. For example, the conditioning fluid must be circulated continuously through the heat exchanger regardless of the demands of the main thermostat. As a result, the air surrounding the heat exchanger is always conditioned, even though the thermostat is satisfied, and excessive heat losses occur. Moreover, the fluid pump also operates continuously and substantial power losses ensue. Further, the heating or cooling mechanisms must operate intermittently to replace the heat losses developed when the main thermostat is satisfied as well as when it is unsatisfied and additional power losses are present. When a plurality of rooms are to be conditioned with the use of a like plurality of such systems, losses of this kind are increased in at least direct proportion.

I have invented control apparatus for use in air conditioning systems servicing a plurality of rooms or zones which obviates these difficulties.

Accordingly, it is an object of the present invention to provide new and improved control apparatus of the character indicated.

Another object is to provide new and improved control apparatus adapted to synchronize fan and circulating pump operation.

A further object is to provide new and improved control apparatus including a novel control unit incorporating as interconnected elements a transformer and a plurality of relays.

Still a further object of the invention is to provide new and improved control apparatus wherein a plurality of main thermostats control a like plurality of relays, each relay rendering a corresponding fan and a common pump synchronously operative or inoperative in accordance with the demands of the corresponding thermostat.

Figure 2:
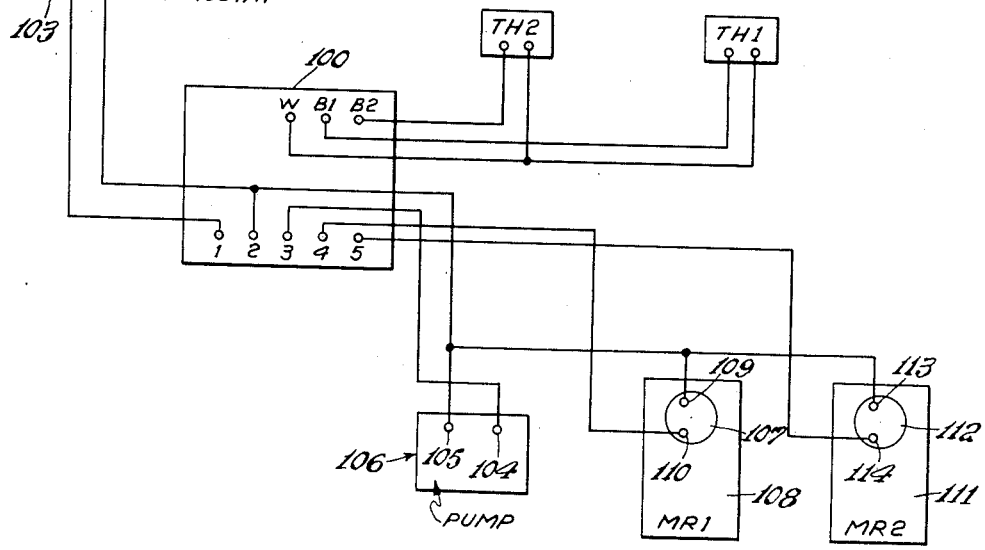

These and other objects of the invention will either be explained or will become apparent to those skilled in the art when this specification is studied in conjunction with the accompanying drawings wherein:

Figure 1 illustrates diagrammatically a control unit in accordance with the present invention; and Figure 2 shows a control system in accordance with the invention which incorporates the control unit shown in Figure 1.

Briefly stated, my invention contemplates an air conditioning system for conditioning a plurality of zones. When two zones are to be conditioned, for example, two heat exchangers such as hollow finned coils are provided. A fan is mounted adjacent each coil to force air thereacross. A common circulator or pump forces conditioning fluid through each of the coils. The conditioned air produced at any coil when its associated fan is operative is then supplied to the corresponding zone. Further, two thermostats are provided, one for each zone, each thermostat being responsive to the conditioned air supplied to the corresponding zone.

The invention, in this example, further includes two relays, each of which has first and second mutually exclusive electric states. When any relay is in the first state, electric power is supplied to the corresponding fan and the pump to operate both in synchronism. When this relay is in its second state, no power is supplied. An electric circuit including the thermostat corresponding to this relay maintains the relay in the second state when the thermostat is satisfied, and places this relay in the first state only when the thermostat is not satisfied.

The common pump and the fans are each provided with two electric terminals and are rendered operative only when electric power is supplied thereto. A conventional 110 volt or 220 volt alternating current source supplies this power through a control unit which includes a transformer and the above mentioned relays.

The source is connected across the primary winding of the transformer; one end of this primary winding is also connected to one terminal of each fan and the pump.

Each relay includes a relay winding connected at one end to one end of the secondary winding of the transformer. The corresponding thermostat is connected between the other end of the secondary winding and the other end of the relay winding.

Each relay further includes first, second and third switching contacts and a common contact, all contacts being electrically connected when the relay winding is energized, and being electrically isolated from each other when the relay winding is deenergized. The first contacts of all relays are connected to the other end of the primary winding of the transformer; the second contacts are connected to the other terminal of the pump. The third contact of each relay is connected to the other terminal of its corresponding fan.

Under these conditions, when any thermostat is unsatisfied, its corresponding relay is actuated, causing the pump and the corresponding fan to be energized simultaneously. When this thermostat is satisfied, its relay is deactivated and no power is supplied therethrough to the pump and fan.

While the system described in this example is adapted for conditioning two zones, it will be obvious to those skilled in the art that an indefinitely increased number of zones can be so conditioned if the number of thermostats, relays, and fans are increased proportionally.

Referring now to Figure 1, there is shown a control unit 100 including transformer T1; a first relay with winding R1, common contact 13 and switching contacts 10, 11, and 12; and a second relay with winding R2, common contact 13′, and switching contacts 10′, 11′, and 12′.

The relays are of conventional construction. When a relay winding is energized, the relay action causes the common contact to short all three switching contacts; when deenergized, all contacts are electrically isolated from each other.

The primary winding of transformer T1 is connected between terminals 1 and 2. Terminal 1 is also connected to switching contacts 11 and 11'. Contacts 10 and 10' are connected to terminal 3. Contact 12 is connected to terminal 4. Contact 12' is connected to terminal 5.

One end of the secondary winding of transformer T1 is connected to terminal W. One end of winding R1 is connected to terminal B1. One end of winding R2 is connected to terminal B2. The other ends of all these windings are connected together.

The external electrical connections to unit 100 are shown in Figure 2. Main thermostat TH1 is connected between terminals W and B1. Thermostat TH2 is connected between terminals W and B2.

Line voltage is applied between terminals 101 and 102. Terminal 102 is connected directly to terminal 2, while terminal 101 is connected through auxiliary thermostat 103 to terminal 1. Terminals 2 and 3 are respectively connected to terminals 104 and 105 of pump 106.

Also included are motorized radiators MR1 and MR2. MR1 is provided with a heat exchanger coil 108 and a fan 107 with terminals 109 and 110 connected to terminals 2 and 4 respectively. MR2 is provided with coil 111 and fan 112 with terminals 113 and 114 connected to terminals 2 and 5 respectively.

Pump 106, when energized, forces conditioning fluid through both coils. The auxiliary thermostat 103 controls heating or cooling mechanisms which regulate the temperature of the conditioning fluid.

Various types of piping connections between the coils, pump, and heating and cooling mechanisms are well known to the art and are not shown here. Any conventional arrangement is satisfactory. Similarly, the control connections between the auxiliary thermostat and these mechanisms are also well known and are not shown.

When my invention is to be used as an air heating system, the auxiliary thermostat can be a reverse acting thermostat which allows line voltage to be supplied to the control unit only when the conditioning fluid, for example hot water, attains a minimum temperature, for example of 180° F. The main thermostats are set for minimum heating temperatures; when positioned in the zones to be heated, a typical such temperature can be 70° F. When both thermostats are satisfied (i. e., the zone temperatures equal or exceed 70° F.), both relays are deenergized and the fans and pump are inoperative.

When the temperature in any zone falls below 70° F., the main thermostat in this zone is unsatisfied and its relay is energized. (The aquastat, of course, must be satisfied.) At this point, power is supplied through the switching contacts to the pump and corresponding fan, and both are energized simultaneously. As soon as the zone temperature is raised to 70°, the thermostat is satisfied and both fan and pump are deenergized simultaneously.

When my invention is to be used in an air cooling system, operation will proceed in the same manner, except that reverse acting zone thermostats are used.

Best results are obtained when transformer T1 is a step down transformer having a secondary voltage, for example, of 24 volts, thus permitting the use of low voltage high sensitivity thermostats.

Various other embodiments of my invention will be apparent to those skilled in the art, and it is my intention not to be limited to the embodiments shown, but rather only by the claims which follow.

I claim:

1. A control unit for use in an air conditioning system comprising a transformer with primary and secondary windings; a plurality of relays, each provided with a relay winding, first, second and third switching contacts and a common contact, each relay having a first state in which all its contacts are electrically interconnected and a second state in which all its contacts are electrically isolated; means connecting one end of each relay winding to one end of the secondary transformer winding; means connecting the second contact of each relay to one end of the primary transformer winding; and means interconnecting the first contacts of all relays.

2. A control unit as set forth in claim 1 wherein said plurality is equal to 2.

3. A control unit as set forth in claim 2 further including first and second terminals connected to opposite ends of the primary transformer winding; third, fourth and fifth terminals respectively connected to the other end of the transformer secondary winding, the other end of the first relay winding and the other end of the second relay winding, a sixth terminal connected to the interconnected second relay contacts; and seventh and eighth terminals respectively connected to the third contacts of the first and second relays.

4. In an air conditioning system, first and second hollow finned coils, each coil adapted to condition air thereacross when conditioning fluid is passed therethrough; first and second electric fans, each fan being positioned adjacent its corresponding coil to pass air thereacross when the fan is energized; means including an electric pump for forcing said fluid through said coils only when the pump is energized; first and second electric power supply means respectively including first and second electric devices having first and second mutually exclusive electric states for simultaneously energizing the pump and the corresponding fan only when the corresponding device is in its first state; and first and second control power means respectively including first and second thermostats responsive to the conditioned air from the corresponding coil and respectively coupled to the corresponding device to place same in the first state when the corresponding thermostat is unsatisfied, the corresponding device being placed in the second state when the corresponding thermostat is satisfied.

5. An air conditioning system as set forth in claim 4 wherein both thermostats are heating thermostats.

6. An air conditioning system as set forth in claim 4 wherein both thermostats are cooling thermostats.

7. In combination, an alternating voltage source; a transformer provided with a primary winding connected across said source and a secondary winding; first and second electric fans, each fan having first and second terminals, the second fan terminals being connected to one end of the primary winding; a pump having first and second terminals the second pump terminal being connected to said one end of the primary winding; first and second relays, each relay being provided with a relay winding connected at one end to one end of the secondary winding and first, second and third switching contacts and a common contact, all relay contacts of any relay being electrically inter-connected when its relay winding is energized and being electrically isolated from each other when its relay winding is deenergized; first and second thermostats, each thermostat being coupled between the other end of the secondary winding and the other end of the corresponding relay windings; means connecting the first contacts of both relays to the first pump terminal; means connecting the second contacts of both relays to the other end of the primary winding; and means respectively connecting the third contacts of said first and second relays to the first terminal of said first and second fan whereby when one of said thermostats is unsatisfied, the corresponding relay winding is energized and the corresponding fan and pump are simultaneously energized and when both thermostats are satisfied, the fans and pump are deenergized.

8. The combination as set forth in claim 7, further including first and second hollow finned coils positioned adjacent to corresponding fans, each coil being adapted to condition air forced thereacross when conditioning fluid is forced therethrough, said pump when energized being adapted to force said fluid through said coils.

9. The combination as set forth in claim 8, further including an auxiliary thermostat interposed between the source and one end of the primary transformer winding.

10. The combination as set forth in claim 9 wherein said auxiliary thermostat is a reverse acting aquastat and the first and second thermostats are heating thermostats.

References Cited in the file of this patent

UNITED STATES PATENTS

| | | |
|---|---|---|
| 1,782,209 | Mauck | Nov. 18, 1930 |
| 1,972,501 | Trogner | Sept. 4, 1934 |
| 2,450,478 | Johnson | Oct. 5, 1948 |

FOREIGN PATENTS

| | | |
|---|---|---|
| 1,081,729 | France | June 9, 1954 |